Feb. 18, 1958  L. C. SCHRADER  2,823,931
TRAILER COUPLING OF THE BALL AND SOCKET TYPE
Filed Nov. 7, 1955  3 Sheets-Sheet 2
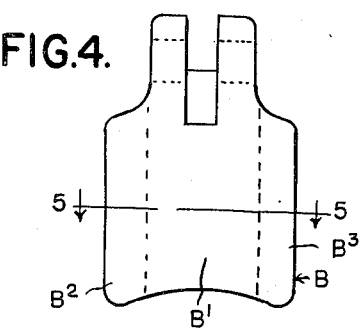
FIG.4.
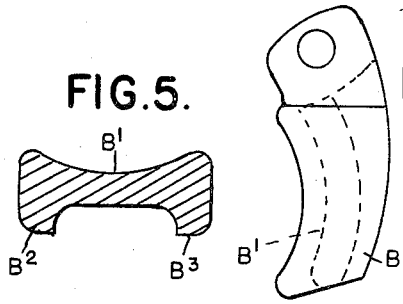
FIG.5. FIG.3.
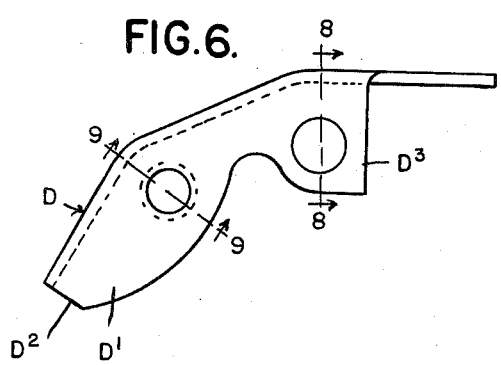
FIG.6.
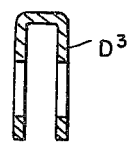
FIG.8.
FIG.9.
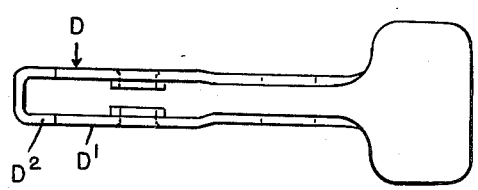
FIG.7.
INVENTOR.
LEROY C. SCHRADER
BY
ATTORNEYS Feb. 18, 1958 L. C. SCHRADER 2,823,931
TRAILER COUPLING OF THE BALL AND SOCKET TYPE
Filed Nov. 7, 1955 3 Sheets-Sheet 3

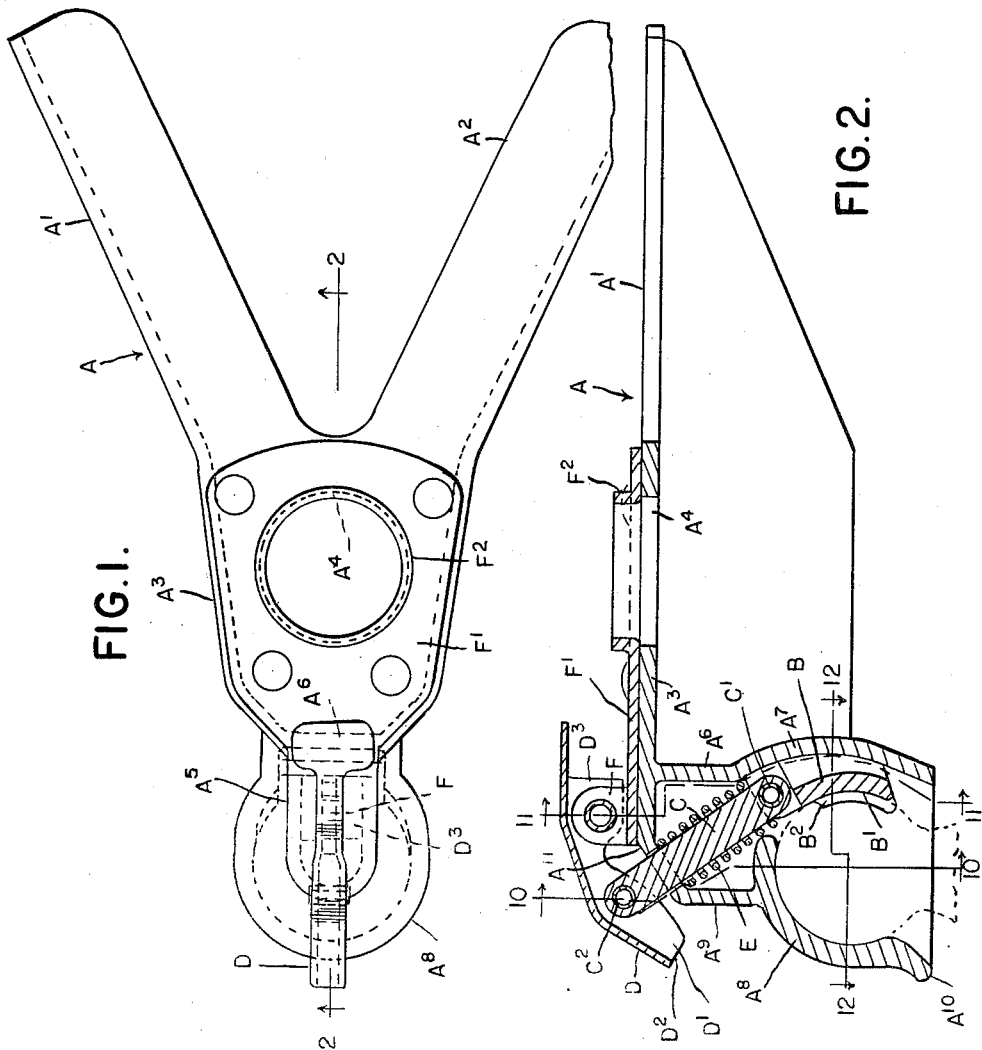

INVENTOR.
LEROY C. SCHRADER
BY
Whittemore Halbart Belknap
ATTORNEYS

United States Patent Office 2,823,931
Patented Feb. 18, 1958

2,823,931

TRAILER COUPLING OF THE BALL AND SOCKET TYPE

Le Roy C. Schrader, Sturgis, Mich., assignor to Marvel Industries, Inc., Sturgis, Mich., a corporation of Michigan Application November 7, 1955, Serial No. 545,158

3 Claims. (Cl. 280—513)

The invention relates to trailer couplings of that type in which the tongue or draft member of the vehicle is connected to the draft vehicle by a ball and socket coupling, together with mechanism by which said members may be locked against disengagement from each other and released when so desired. It is the object of the invention to simplify this locking mechanism and also to reduce the dimensions of the structure in which it is installed. To this end the invention consists in the construction as hereinafter set forth.

In the accompanying drawings:

Fig. 1 is a plan view of the trailer coupling.

Fig. 2 is a longitudinal section on line 2—2, Fig. 1.

Fig. 3 is a side elevation of the locking member detached.

Fig. 4 is a front elevation thereof.

Fig. 5 is a cross section on line 5—5, Fig. 4.

Fig. 6 is an elevation of the operating lever detached.

Fig. 7 is a bottom plan view thereof.

Fig. 8 is a cross section on line 8—8, Fig. 6.

Fig. 9 is a cross section on line 9—9, Fig. 6.

Figure 10:
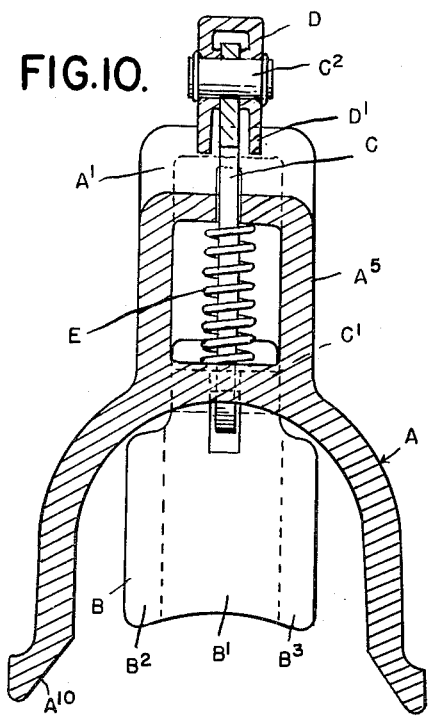
Figure 11:
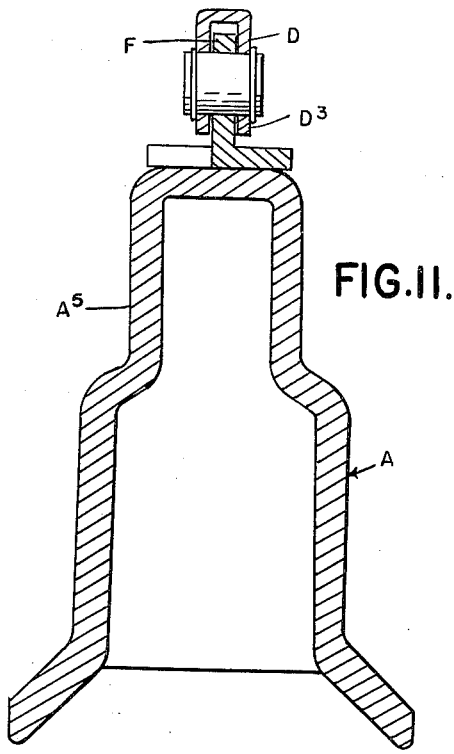
Figure 12:
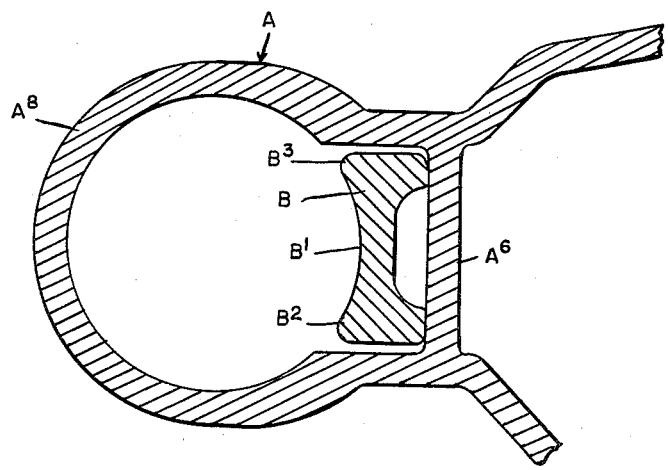

Figs. 10, 11 and 12 are sections respectively on lines 10—10, 11—11 and 12—12, Fig. 2.

As heretofore constructed couplers of this type have usually included a segmental spherical socket member which is less than a semisphere in extent and a supplemental segmental member pivotally attached to the former to swing between a locking and a releasing position. In the former it extends the spherical socket to more than a semisphere while in the latter position it opens the socket to the full diameter of the ball so as to permit engagement or disengagement thereof. The mechanism for manually operating and controlling this pivotal member usually includes a number of separate elements, such as cams, rock shafts, etc. I have simplified the construction reducing the number of separate elements and reorganizing those that are retained.

As illustrated in Figs. 1 and 2, A is a casting for attachment to the tongue of the trailer and which is provided with diverging rearwardly extending angle portions $A^1$ and $A^2$ for attachment to the converging draft bars of the tongue. Forward of the point of divergence the member A has a portion $A^3$ of inverted U-shaped cross section which at its top is apertured at $A^4$ for the passage of a vertically adjustable post (not shown) used for engaging and disengaging the ball and socket members and also supporting the tongue of the trailer when detached from the trailer vehicle. Forward of the portion $A^3$ the casting is reduced in width at $A^5$ and is provided therein with a cross wall $A^6$ having an arcuate portion $A^7$ therein. Forward of the portion $A^5$ the casting is expanded in width to form a segmental spherical socket portion $A^8$ which is less than a semisphere in extent and is in advance and above an oblique plane. The center of this semisphere is below the center of the arcuate portion $A^7$ and is also spaced from the latter by a dimension greater than the radius of said semisphere. Both of these portions extend below the horizontal plane of the center of the semisphere so that the portion $A^7$ below the plane of its center converges towards the portion $A^8$. Above the portion $A^8$ is a still narrower portion $A^9$ which extends upward to the level of the top of the portion $A^3$. With the construction as above described the opening from the bottom into the segmental spherical socket $A^8$ is equal in width to the diameter of said socket and has outwardly flaring flanges $A^{10}$ at the lower end thereof for guiding the ball member (not shown) into the socket. Longitudinally the opening in rear of the portion $A^8$ is at least equal or greater than the diameter of the socket so that to in no way interfere with the entrance of the ball.

B is the locking member for the ball within the socket $A^8$ which is free from the member A and has on its forward face a segmental spherical portion $B^1$ complementary to the portion $A^8$ and at its rear has spaced portions $B^2$, $B^3$ which are arcuate and of a radius equal to that of the arcuate portion $A^7$. The centers of the portions $B^1$ and $B^2$, $B^3$ are in the same relation to each other as the corresponding portions in the member A which gives to the member B a downwardly tapering wedge shaped form. C is a rod pivotally attached at its lower end to the upper end of the member B by a pin $C^1$. This rod extends obliquely upward through the portion $A^9$ and outward through an aperture in the top $A^{11}$ of this portion which is inclined substantially at right angles to the inclination of the rod. The outer end of the rod is pivotally connected by a pin $C^2$ with a lever D. There is also a coil spring E sleeved on the rod C extending between the portion $A^{11}$ and the upper end of the member B, being precompressed to resiliently force said member B downward. The lever D may be formed of pressed sheet metal of U-shaped cross section to embrace the upper end portion of the rod C and extends oppositely from the pin $C^2$. The sides $D^1$ of the U-shaped section in the portion thereof extending to the left, Fig. 2, have their edges fashioned to form a cam which when the lever is turned on the pin $C^2$ will bear against the portion $A^{11}$ and draw the rod C outward against the tension of the spring E. When this portion of the lever is in substantial alignment with the rod the end $D^2$ bearing on the portion $A^{11}$ will hold the parts in this position. Such outward movement of the rod C will draw the member B upward around the arcuate bearing $A^7$, thereby opening the socket for entrance or disengagement of the ball member. The portion $D^3$ of the lever D extending to the right of the pin $C^2$, Fig. 2, forms an operating handle. The side flanges of this portion are apertured to embrace a similarly apertured lug F extending upward from the member A to which it is secured. As shown this lug F is formed integral with a plate $F^1$ which extends along the top of the member A and is bolted or otherwise secured thereto. This plate is apertured and provided with an annular flange $F^2$ surrounding the same for engagement with the lifting post (not shown).

In operation to effect the coupling between the ball and socket, the lever D is turned into a position where it withdraws the member B to permit free entry of the ball. The lever is then turned into the position shown in Fig. 2, the spring E forcing the rod C downward and moving the wedge shaped member B around the arcuate curve $A^7$. As this curve converges towards the circle of the socket the member B when moved downward will also move laterally towards this circle until the segmental spherical surface $B^1$ coincides therewith. In this position the socket portion $A^8$ supplemented by the portion $B^1$ extends more than a semisphere and will therefore hold the ball from disengagement. All portions of the curve $A^7$ will be within the angle of friction with respect to draft stresses in the ball so that the latter cannot displace the member B. However, at any time operation of the lever D will withdraw the member B to permit disengagement of the coupling. In the normal position of the lever D, shown in Fig. 2, the cam $D^1$ is spaced from the portion $A^{11}$ of the casting. Thus, any wear in the member B which reduces its width will be compensated for by a further downward movement of said member under the resilient pressure of the spring E without interference by the cam.

What I claim as my invention is:

1. In a trailer coupling of the ball and socket type, a draft member having at its forward end a rearwardly and downwardly facing segmental spherical socket portion limited in extent to not more than one-half of the sphere but extending below as well as above the horizontal plane of its center, a separate longitudinally movable member of tapering wedge form, one side of which and in one position thereof forms an extension of said socket to more than one-half the sphere, the other side being an eccentric arcuate curve, and a wall portion of said draft member in rear of and rigid with said socket portion having a similar arcuate curved surface in contact with that of said wedge and within the angle of friction relative to displacement of said movable member by any draft stresses transmitted through said coupling and operating means for withdrawing said wedge longitudinally along said arcuate wall surface until the opening into said socket is equal to its internal diameter.

2. The construction as in claim 1 in which said operating means consists of a rod pivotally attached to said movable wedge member and extending upward through an aperture in the top of said draft member to above the same, a lever fulcrumed on said draft member pivotally connected to the upper end of said rod and a spring sleeved on said rod between the top of said draft member and said wedge for forcing the latter downward.

3. The construction as in claim 1 in which the arcuate surface of said wall extends below the horizontal plane of its center.

References Cited in the file of this patent
UNITED STATES PATENTS

| | | |
|---|---|---|
| 2,115,629 | Gurley | Apr. 26, 1938 |
| 2,149,189 | Shaffer | Feb. 28, 1939 |
| 2,166,208 | Dayton | July 18, 1939 |
| 2,178,094 | Berluti | Oct. 31, 1939 |